(12) United States Patent
Miller

(10) Patent No.: US 6,711,636 B1
(45) Date of Patent: Mar. 23, 2004

(54) TRANSFER ATTRIBUTE ENCODING WITHIN AN ADDRESS ON A BUS

(75) Inventor: Steven Miller, Livermore, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/407,421

(22) Filed: Sep. 29, 1999

(51) Int. Cl.[7] .............. G06F 15/00; G06F 9/22; G06F 13/00; G06F 17/00
(52) U.S. Cl. .............. 710/65; 710/1; 710/23; 710/33; 710/100; 710/129; 712/43
(58) Field of Search .............. 710/1, 129, 23, 710/33, 65, 100; 712/43

(56) References Cited

U.S. PATENT DOCUMENTS

| | | | |
|---|---|---|---|
| 5,727,219 A | 3/1998 | Lyon et al. | 710/268 |
| 5,828,853 A * | 10/1998 | Regal | 710/315 |
| 5,862,407 A * | 1/1999 | Sriti | 710/23 |
| 5,867,690 A | 2/1999 | Lee et al. | 710/65 |
| 5,915,104 A | 6/1999 | Miller | 710/129 |
| 5,937,170 A | 8/1999 | Bedarida | 710/100 |
| 5,953,511 A * | 9/1999 | Sescila, III et al. | 710/129 |
| 5,956,516 A | 9/1999 | Pawlowski | 710/260 |
| 6,003,109 A | 12/1999 | Caldwell et al. | 710/262 |
| 6,032,212 A | 2/2000 | Goode et al. | 710/129 |
| 6,393,548 B1 * | 5/2002 | Kerstein et al. | 712/43 |
| 6,424,347 B1 * | 7/2002 | Kwon | 345/520 |

OTHER PUBLICATIONS

IBM—Technical Disclosure Bulletin, vol. 38, No. 9, Sep. 1995, pp. 237–240.*

* cited by examiner

*Primary Examiner*—Jeffrey Gaffin
*Assistant Examiner*—Tammara Peyton
(74) *Attorney, Agent, or Firm*—Schwegman, Lundberg, Woessner & Kluth, P.A.

(57) ABSTRACT

In a computer system having a plurality of modules connected by a bus, wherein the plurality of modules includes a first module and wherein the system has a word width of two or more bytes, a system and method of byte swapping bytes within a word stored in a location on the first module. An address is constructed, wherein constructing an address includes inserting address bits pointing to the location and activating an attribute bit in the address indicating whether bytes within the word should be swapped. The address is driven on the bus and received at the first module. If the attribute bit is active, byte swapping the word.

8 Claims, 2 Drawing Sheets

TRANSFER ATTRIBUTE ENCODING WITHIN AN ADDRESS ON A BUS

FIELD OF THE INVENTION

The present invention is related to computer systems, and more particularly to address attribute encoding within an address on a bus.

BACKGROUND INFORMATION

Today's computer systems are very advanced, versatile, and sophisticated. Often, computers include and have to accommodate more than one interconnect network, where each network follows a different network protocol. For instance, computers are commonly called upon to accept and process data from a wide variety of Peripheral Component Interconnect (PCI) devices such as modems, disk drives, network controllers, and printers via a PCI bus. Generally a bridge is interposed between the different networks and acts as an interface between the networks. All read/write operations involving PCI devices are routed to/from a PCI device via the PCI bus, through the bridge, to a memory controller and to/from the main memory. Because the bridge acts as an interface between two bus schemes it must accomplish certain tasks so that the data may be transferred across the two bus schemes. These tasks include encoding and translating the data for compatibility when transferring data from one bus scheme to another. Usually a bridge is used to overcome certain limitations of the older and slower PCI bus by interposing the bridge between the PCI bus and a newer and faster bus architecture. This poses several problems in transmitting data across the two bus schemes through the bridge, because, in many cases, the newer and faster bus uses a different method for encoding the data transmitted across the bus. To facilitate compatibility between the two bus schemes, the bridge must translate and encode the data to be transmitted from one bus to another through the bridge such that the data is transmitted across the two bus schemes efficiently.

Currently, byte swapping to handle little endian/big endian transformations are done by configuring each PCI device. Once configured, the device stays in that configuration until changed.

What is needed is a system and method for handling such byte swapping transformations on a transfer by transfer basis. This would result in faster, more flexible, data transfers between the two networks.

SUMMARY OF THE INVENTION

According to one aspect of the present invention, in a computer system having a plurality of modules connected by a bus, wherein;the plurality of modules includes a first module and wherein the system has a word width of two or more bytes, a system and method of byte swapping bytes within a word to be written to a location. An address is constructed, wherein constructing an address includes inserting address bits pointing to the location and activating an attribute bit in the address indicating whether bytes within the word should be swapped. The address and the word are driven on the bus and received at the first module. If the attribute bit is active, the word is byte swapped.

According to one aspect of the present invention, in a computer system having a plurality of modules connected by a bus, wherein the plurality of modules includes a first module and wherein the system has a word width of two or more bytes, a system and method of byte swapping bytes within a word to be read from a location. An address is constructed, wherein constructing an address includes inserting address bits pointing to the location and activating an attribute bit in the address indicating whether bytes within the word should be swapped. The address is driven on the bus and received at the first module. The word is fetched and, if the attribute bit is active, the word is byte swapped.

According to yet another embodiment, a computer system includes a bus and first and second devices connected to the bus. The first device includes byte swapping capability at the transfer level. The second device constructs an address having an attribute bit and drives the address on the bus. The attribute bit indicates whether bytes within the word should be swapped. When the first device receives the address from the bus, it checks if the attribute bit is active and, if the attribute bit is active, byte swaps a word associated with the address.

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the figures generally corresponds to the figure number in which that component is first introduced, such that the same reference number is used throughout to refer to an identical component which appears in multiple figures. Signals and connections may be referred to by the same reference number or label, and the actual meaning will be clear from its use in the context of the description.

The present document describes, among other things, a system and a method in a computer system for byte swapping bytes within a word to be written to a location. The computer system includes, among other things, a plurality of modules connected by a bus, wherein the plurality of modules includes a first module and wherein the system has a word width of two or more bytes. An address is constructed by the present system and method by inserting address bits pointing to the location and activating an attribute bit in the address indicating whether bytes within the word should be swapped. The first module receives the address and word that are driven on the bus. If the address attribute bit is active, the word is byte swapped by the first module.

Figure 1:
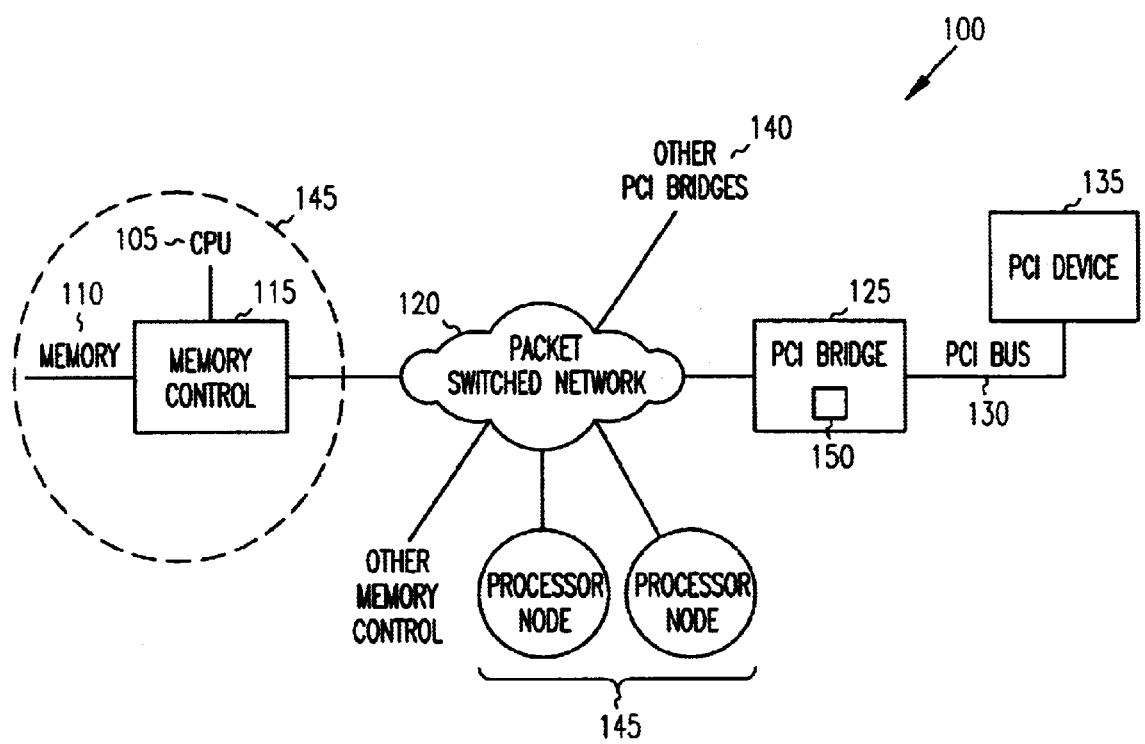
FIG. 1 illustrates one embodiment of a computer system that implements the present invention.

FIG. 1 is one embodiment of a computer system 100 including the present invention. In one embodiment, computer system 100 includes a plurality of processor nodes 145 connected via a packet switched network 120. Each processor node 145 includes one or more CPUs 105 connected to a memory controller 115 coupled to memory 110. A bridge device 125 is connected to packet switched network 120 on one end and acts as an interface to packet switched network 120 so that various standard PCI devices 135 (e.g., printers, monitors, modems, disk drives, etc.) may be coupled to bridge 125 via a PCI bus 130.

PCI bus 130 includes an address space. In one embodiment, the address used in the address space is 32 bits and in an alternate embodiment, the address used in the address space is 64 bits and upper address bits in the address as attribute bits. Since bridge 125 acts as an interface between two types of network protocols, packet switched network 120 and PCI bus 130, which use different types of byte ordering for words, in one embodiment the bytes must be swapped for data to be transferred between the two busses. In one embodiment, a word is defined on a PCI device as 16 bits and a double word is defined as 32 bits. Bridge 125 includes bytes swapping mechanism 150 that facilitates byte swapping. In one embodiment, byte swapping is provided on a per device 135 basis using device requesters in bridge 125. Bridge 125 also connects to one or more PCI bridges 140 through packet switched network 120.

In one embodiment, bridge 125 uses upper address bits within the 64 bit address space of PCI bus 130 as attribute bits for PCI device transactions. For example, in one embodiment, an upper address bit is used as a swap attribute bit. If the swap attribute bit is set, bridge 125 swaps the bytes within a word contained in the data sent by PCI devices 135 and transfers the swapped bytes via packet switched network 120 to memory controller 115 or to other PCI bridges 140 or to one of the processor nodes 145.

When transferring data from multiple PCI devices it may be beneficial to swap the bytes for each transfer of data from multiple PCI devices 135 to bridge 125 instead of swapping the bytes for all data transferred from one of the PCI devices designated to transfer data. Swapping bytes for each transfer of data accelerates the total transfer of data on PCI bus 130 and increases the efficiency of the bridge as an interface to packet switched network 120.

In one embodiment, bridge 125 receives data transmitted by PCI devices 135 via PCI bus 130 for a transfer to memory controller 115 or to other PCI bridges 140 or to one of the processor nodes 145. Bridge 125 determines if an attribute for transferring data was set in an upper address bit of PCI bus 130. In one embodiment, the attribute for transferring data is set and is a swap attribute. Upon detecting that the swap attribute was set, bridge 125 swaps the byte order of the data to facilitate the communication between packet switched network 120 and PCI bus 130 and transfers the data via packet switched network 120 to memory controller 115 or to other bridges 140 or to one of the processor nodes 145. PCI bus 130 uses a method called little endian of ordering the bytes in a word in which the least significant bytes are placed leftmost in the word. A word on a PCI bus is defined as 16 bits and a double word is defined as 32 bits. In one embodiment, packet switched network 120 uses a method of ordering bytes in a word called big endian. Big endian orders the bytes in a word such that the most significant bytes are placed leftmost in a word. As a result the bytes in words contained in data transferred from PCI device 135 must be swapped in the word by bridge 125 for data to be transferred correctly from PCI bus 130 to packet switched network 120.

When transferring data from multiple PCI devices it may be beneficial to swap the bytes for each transfer of data from multiple PCI devices to bridge 125 instead of swapping the bytes for all data transferred from one of the PCI devices selected to transfer data. Swapping bytes for each transfer of data accelerates the total transfer of data on PCI bus 130 and increases the efficiency of the bridge as an interface to packet switched network 120. The present invention accomplishes this goal.

Figures 2, 3:
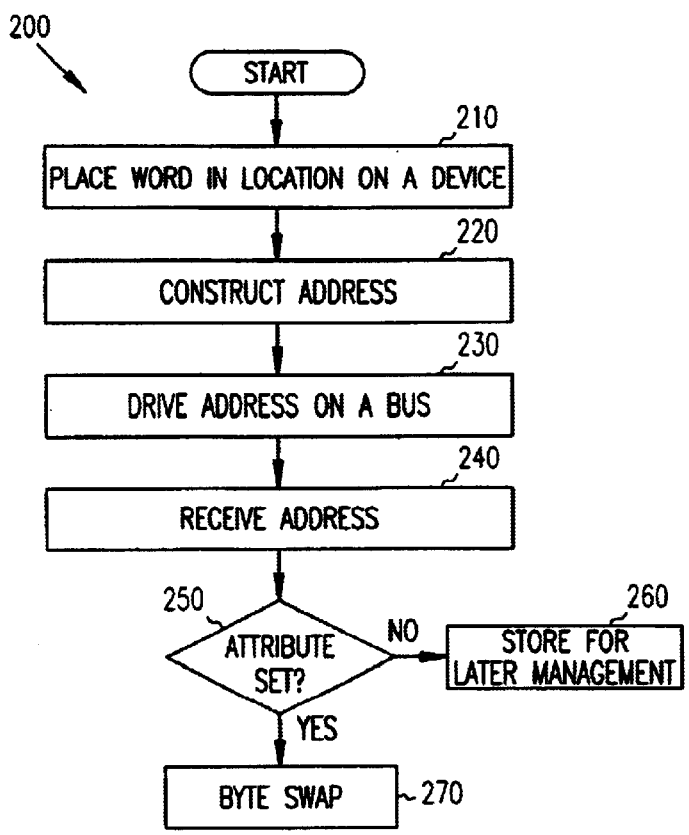
FIG. 2 shows one embodiment of a block diagram for using address bits as attributes for the transfer of data.
FIG. 3 illustrates one embodiment of the use of upper address bits on a PCI bus.

FIG. 2 depicts one embodiment of a block diagram 200 that uses an upper address bit on PCI bus 130 as an attribute for the transfer of data through bridge 125 via packet switched network 120 to memory controller 115, or to other bridges 140, or to one of the processor nodes 145. At 210, a word is placed in a location on a first device such as one of the PCI devices 135. An address for one of the PCI devices 135 is constructed at 220 using address bits pointing to the location of the device and activating an attribute bit in the address indicating whether the bytes in a word should be swapped. At 230, the address is then driven on a bus, such as PCI bus 130 and received 240 by a second device, such as bridge 125. At 250, if the attribute bit is set, the bytes in the word are swapped by the second device 270. If the attribute bit is not set 250 in the address, the address is stored for later management.

FIG. 3 illustrates one embodiment 300 of the use of upper address bits in a 62 bit address on PCI bus 130. Swap attribute 310 at address 55 is set when bytes in a word contained in data transferred from one of the PCI devices 135 should be swapped. Other attributes shown in section 305 and in 315 may be set for use in other operations.

It is understood that the above description is intended to be illustrative, and not restrictive. Many other embodiments will be apparent to those of skill in the art upon reviewing the above description. The scope of the invention should therefore, be determined with reference to the appended claims, along with the full scope of equivalents to which such claims are entitled.

What is claimed is:

1. A computer system, comprising:
   a plurality of nodes;
   a network connecting the plurality of nodes;
   a Peripheral Component Interconnect (PCI) bus;
   a PCI device connected to the PCI bus; and
   a bridge coupled to the PCI bus and to the network, wherein the bridge includes a byte swapping mechanism, wherein the PCI device constructs an address having an attribute bit, wherein the attribute bit indicates whether bytes within a word should be swapped and wherein the PCI device drives the address on the bus;
   wherein the bridge receives the address from the PCI bus, checks if the attribute bit is active and, if the attribute bit is active, byte swaps a word associated with the address to form a byte swapped word.

2. The computer system of claim 1, wherein, on a PCI write, the bridge drives the byte swapped word onto the network.

3. The computer system of claim 1, wherein, on a PCI read, the bridge fetches the word from across the network before byte swapping the word.

4. A method of swapping bytes in a multiprocessor computer system comprising a plurality of processor nodes, comprising:
   receiving in a PCI bus bridge connected to a PCI bus and connected to a network connecting the plurality of processor nodes an address having an attribute bit encoded to indicate whether bytes within an associated word should be swapped,
   evaluating the attribute bit to determine whether the PCI bus bridge should swap bytes; and
   if it is determined that the PCI bus bridge should swap bytes, swapping the bytes of the associated word.

5. The method of claim 4, wherein on a PCI write, the bridge drives the byte swapped word onto the network.

6. The method of claim 4, wherein on a PCI read, the bridge fetches the word from across the network before byte swapping the word.

7. A multiprocessor computer system, comprising:

a Peripheral Component Interconnect (PCI) bus;

a second processor interconnect bus or network;

a first device connected to the PCI bus, wherein the first device includes byte swapping capability at the transfer level; and a second device connected to the PCI bus, wherein the second device constructs an address having an attribute bit, wherein the attribute bit indicates whether bytes within an associated word should be swapped and wherein the second device drives the address on the bus;

wherein the first device is operable to:

receive the address having an attribute bit from the PCI bus, check the attribute bit to determine whether the bytes of the associated word are to be swapped, byte swap the word associated with the address if the attribute bit indicates that the bytes of the associated word are to be swapped, and send the byte-swapped word across the second processor interconnect bus or network or across the PCI bus.

8. A method of selectively swapping bytes in a multiprocessor computerized system, comprising:

receiving in a first PCI bus device from a second PCI bus device via a PCI bus an address having an attribute bit indicating whether bytes of an associated word are to be swapped, checking in the first PCI bus device the attribute bit to determine whether the bytes of the associated word are to be swapped, byte swapping in the first PCI bus device the word associated with the address if the attribute bit indicates that the bytes of the associated word are to be swapped, and sending the byte-swapped word from the first PCI bus device across a second processor interconnect bus or network or across the PCI bus.

* * * * *

UNITED STATES PATENT AND TRADEMARK OFFICE
CERTIFICATE OF CORRECTION

PATENT NO. : 6,711,636 B1
DATED : March 23, 2004
INVENTOR(S) : Miller

It is certified that error appears in the above-identified patent and that said Letters Patent is hereby corrected as shown below:

Title page, Item [54] and Column 1, lines 1-2,
Title, delete "TRANSFER ATTRIBUTE ENCODING WITHIN AN ADDRESS ON A BUS" and insert -- TRANSFER ATTRIBUTE ENCODING WITHIN PCI CONSTRUCTED ADDRESS TO INDICATE WHETHER BYTES WITHIN A WORD SHOULD BE SWAPPED --, therefor.

Column 6,
Line 7, after "bus" insert -- , --.

Signed and Sealed this

Twenty-ninth Day of June, 2004

JON W. DUDAS
*Acting Director of the United States Patent and Trademark Office*